(12) United States Patent
Pawletki et al.

(10) Patent No.: US 10,835,039 B1
(45) Date of Patent: Nov. 17, 2020

(54) LOW-FRICTION ROLLER ASSEMBLY

(71) Applicants: Dave Pawletki, Itasca, IL (US); Maria Patricia Barlas, Itasca, IL (US); Robert Waichulis, Itasca, IL (US); Michael Herdman, Itasca, IL (US)

(72) Inventors: Dave Pawletki, Itasca, IL (US); Maria Patricia Barlas, Itasca, IL (US); Robert Waichulis, Itasca, IL (US); Michael Herdman, Itasca, IL (US)

(73) Assignee: SHAMROCK INTERNATIONAL FASTENER LLC, Itasca, IL (US)

( * ) Notice: Subject to any disclaimer, the term of this patent is extended or adjusted under 35 U.S.C. 154(b) by 0 days.

(21) Appl. No.: 16/661,852

(22) Filed: Oct. 23, 2019

(51) Int. Cl.
*F16C 29/04* (2006.01)
*A47B 88/437* (2017.01)

(52) U.S. Cl.
CPC ............ *A47B 88/437* (2017.01); *F16C 29/04* (2013.01); *A47B 2210/0043* (2013.01)

(58) Field of Classification Search
CPC .. F16C 13/006; F16C 29/045; F16C 2226/74; F16C 2314/72; A47B 88/437; A47B 88/487; A47B 2210/0037; A47B 2210/0043; Y10T 16/364

USPC ..................................................... 384/19, 418
See application file for complete search history.

(56) References Cited

U.S. PATENT DOCUMENTS

| | | | |
|---|---|---|---|
| 2,717,071 A * | 9/1955 | Cook ................... | A01D 17/10 198/842 |
| 3,874,748 A * | 4/1975 | Figueroa .............. | A47B 88/487 384/19 |
| 4,101,180 A * | 7/1978 | Anderson ............. | B65G 39/20 198/845 |
| 5,156,443 A * | 10/1992 | Ide ........................ | F16C 13/006 301/1 |
| 2016/0238080 A1 * | 8/2016 | Wang ................... | B23P 15/003 |

* cited by examiner

*Primary Examiner* — Phillip A Johnson
(74) *Attorney, Agent, or Firm* — Justin Lampel (57) ABSTRACT

A low-friction roller assembly is provided. The low-friction roller assembly is especially suitable for use in a refrigerator for reducing noise and reducing wobble and vibration. The low-friction roller assembly has a rotating element encased within a fluid and secured within a housing. An axle attached to the rotating element extends outside of the housing and is connected to a wheel via a keyed interlocking component. The wheel is attached to mount assembly in, for example, a refrigerator, which is attached to a movable drawer.

11 Claims, 10 Drawing Sheets

LOW-FRICTION ROLLER ASSEMBLY

BACKGROUND OF THE INVENTION

A low-friction roller assembly is provided. The low-friction roller assembly is especially suitable for use in a refrigerator for reducing noise and reducing wobble and vibration. The low-friction roller assembly has a rotating element encased within a fluid and secured within a housing. An axle attached to the rotating element extends outside of the housing and is connected to a wheel via a keyed interlocking component. The wheel is attached to mount assembly in, for example, a refrigerator, which is attached to a movable drawer.

Damper systems are common. For example, U.S. Pat. No. 10,345,032 to Kang discloses a refrigerator includes a cabinet, a partition wall partitioning the cabinet, an accommodating unit defining an accommodating space and an opening, where the accommodating space is recessed downward from a horizontal top surface of the partition wall, and the opening is located at an upper portion of the accommodating unit and configured to introduce food therethrough, an accommodating unit door located at the upper portion of the accommodating unit and configured to open and close the opening by moving in a direction parallel to the horizontal top surface, a roller located below the accommodating unit door, where the roller supports the accommodating unit door and allows the accommodating unit door to slidingly move with respect to the partition wall, and an upper rib provided at each of left and right portions of the accommodating unit door and configured to restrict splaying of the accommodating unit door.

Further, U.S. Pat. No. 9,217,602 to Lee discloses a refrigerator may include a main body, a storage chamber provided within the main body, a drawer assembly provided in the lower portion of the storage chamber, a cover shelf covering at least a part of the upper surface of the drawer assembly, a lower shelf disposed between the cover shelf and the sidewall of the storage chamber and provided with one side supported by the sidewall of the storage chamber so as to be pulled out and the other side supported by the upper surface of the drawer assembly so as to be pulled out, and an upper shelf disposed above the lower shelf and provided with one side supported by the sidewall of the storage chamber so as to be pulled out and the other side supported by a shelf frame mounted on the rear wall of the storage chamber so as to be pulled out.

However, these patents fail to describe a low-friction roller assembly which is easy to use. Further, these patents fail to provide for a low-friction roller assembly which reduces noise, wobble and vibration as described in the present application.

SUMMARY OF THE INVENTION

A low-friction roller assembly is provided. The low-friction roller assembly is especially suitable for use in a refrigerator for reducing noise and reducing wobble and vibration. The low-friction roller assembly has a rotating element encased within a fluid and secured within a housing. An axle attached to the rotating element extends outside of the housing and is connected to a wheel via a keyed interlocking component. The wheel is attached to mount assembly in, for example, a refrigerator, which is attached to a movable drawer.

An advantage of the present low-friction roller assembly is that the present low-friction roller assembly has a captured rotating shaft element, submerged in an encased fluid and sealed within a mountable housing.

Another advantage of the present low-friction roller assembly is that the present low-friction roller assembly may use different fluids within the interior of the housing unit depending on the desired use of the assembly.

In an embodiment, an advantage of the present low-friction roller assembly is that the present low-friction roller assembly may be easily screwed into place via a screw mount assembly in, for example, a refrigerator or other appliance.

In an embodiment, an advantage of the present low-friction roller assembly is that the present low-friction roller assembly may snap into a fitting in an appliance for easy installation.

An advantage of the present low-friction roller assembly is that the present low-friction roller assembly produces lower noise levels than traditional pull-out drawer assemblies.

Still another advantage of the present low-friction roller assembly is that the present low-friction roller assembly reduces wobble and vibration, therein providing an improved smooth feel while pulling out or pushing in a drawer.

Yet another advantage of the present low-friction roller assembly is that the present low-friction roller assembly may increase the life of the drawer of a refrigerator (or other appliance) by providing a smooth pulling motion on the drawer.

And another advantage of the present low-friction roller assembly is that the present low-friction roller assembly may be inexpensive.

For a more complete understanding of the above listed features and advantages of the low-friction roller assembly reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

A low-friction roller assembly is provided. The low-friction roller assembly is especially suitable for use in a refrigerator for reducing noise and reducing wobble and vibration. The low-friction roller assembly has a rotating element encased within a fluid and secured within a housing. An axle attached to the rotating element extends outside of the housing and is connected to a wheel via a keyed interlocking component. The wheel is attached to mount assembly in, for example, a refrigerator, which is attached to a movable drawer.

Figure 1:
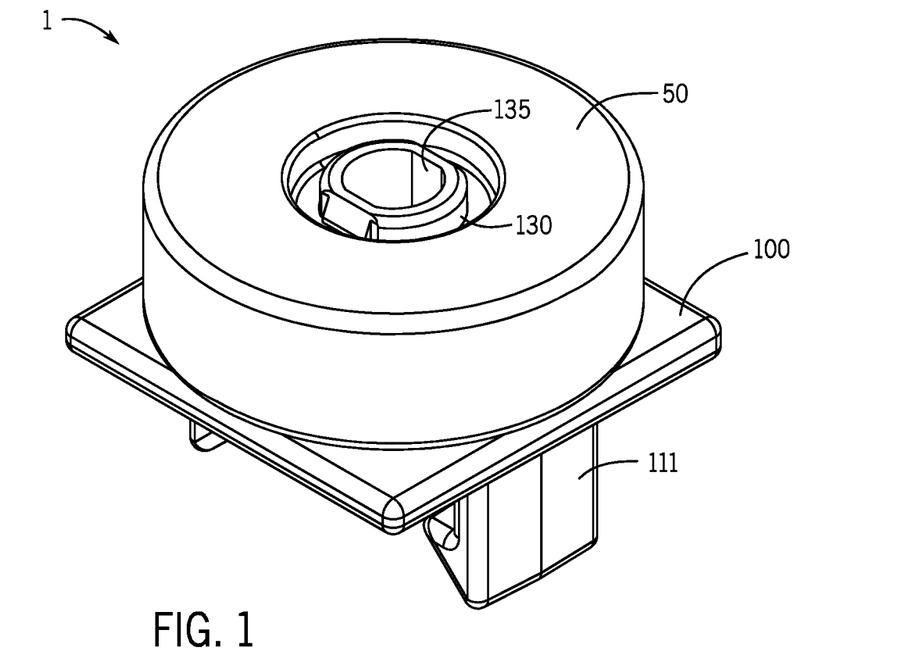
FIG. 1 illustrates a perspective view of the low-friction roller assembly with the wheel attached.
Figure 2:
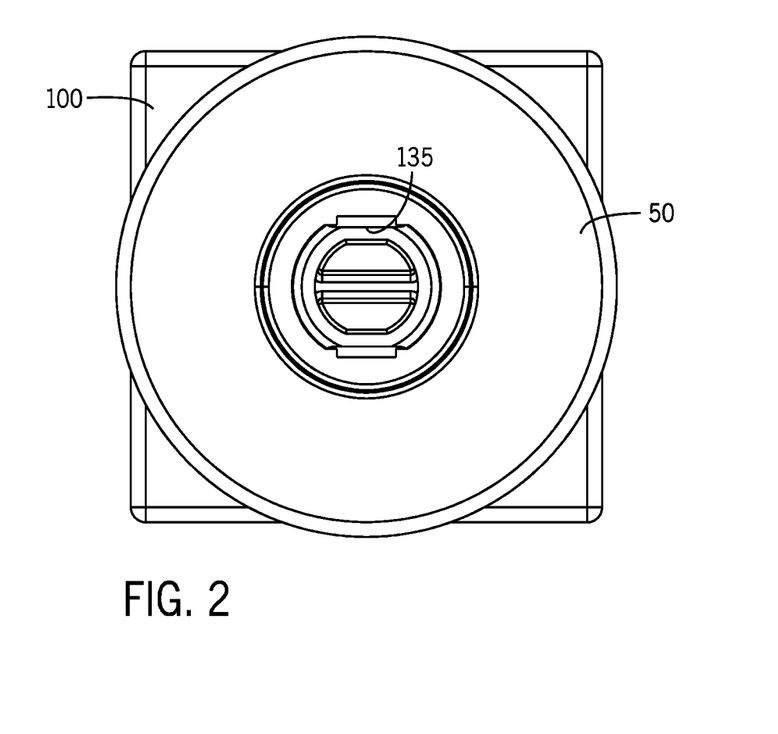
FIG. 2 illustrates a front view of the low-friction roller assembly with the wheel attached.
Figure 3:
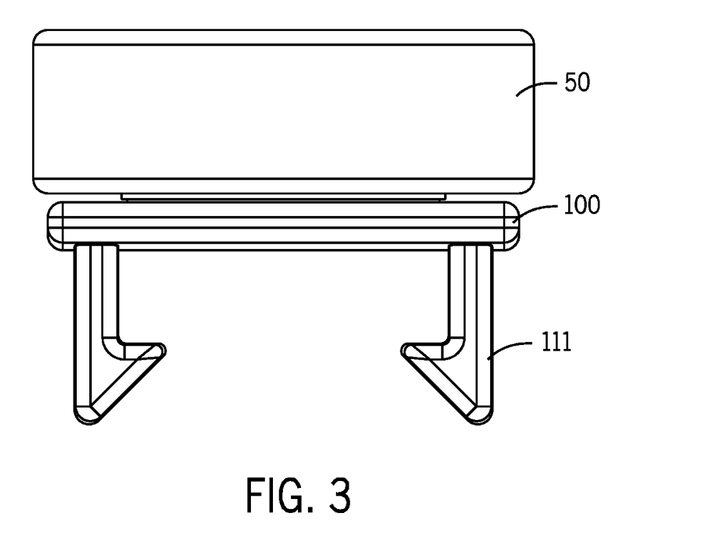
FIG. 3 illustrates a side view of the low-friction roller assembly with the wheel attached.
Figure 4:
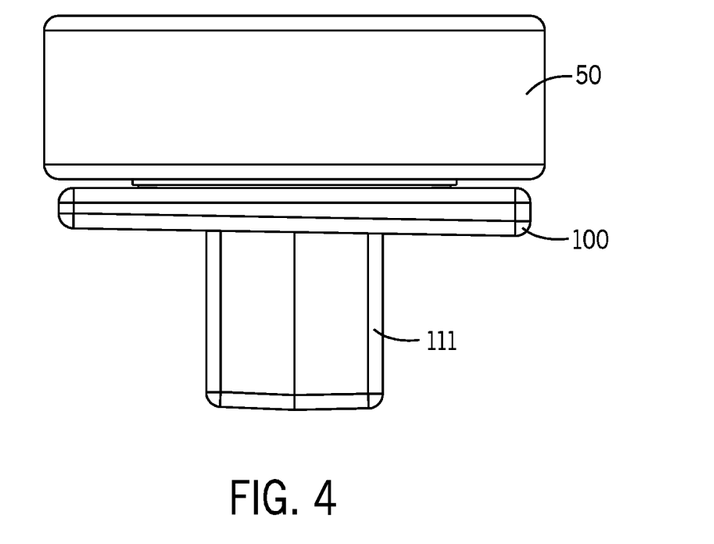
FIG. 4 illustrates a bottom view of the low-friction roller assembly with the wheel attached.
Figure 5:
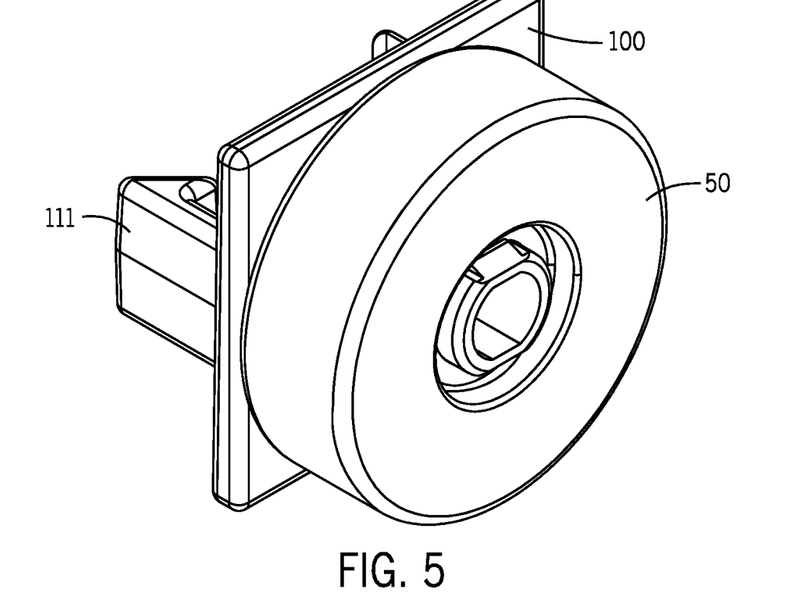
FIG. 5 illustrates a front perspective view of the low-friction roller assembly with the wheel attached.
Figure 6:
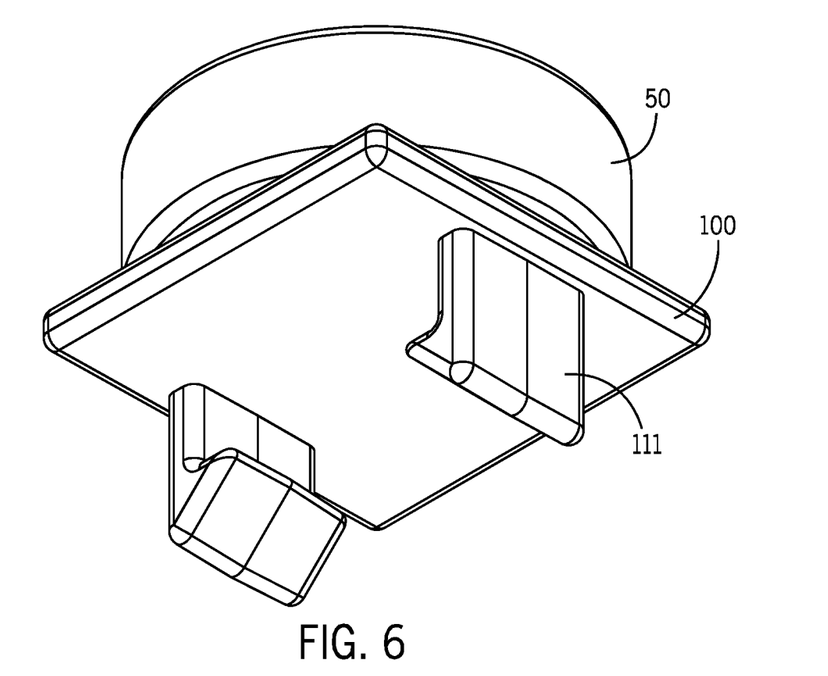
FIG. 6 illustrates a back perspective view of the low-friction roller assembly with the wheel attached.
Figure 7:
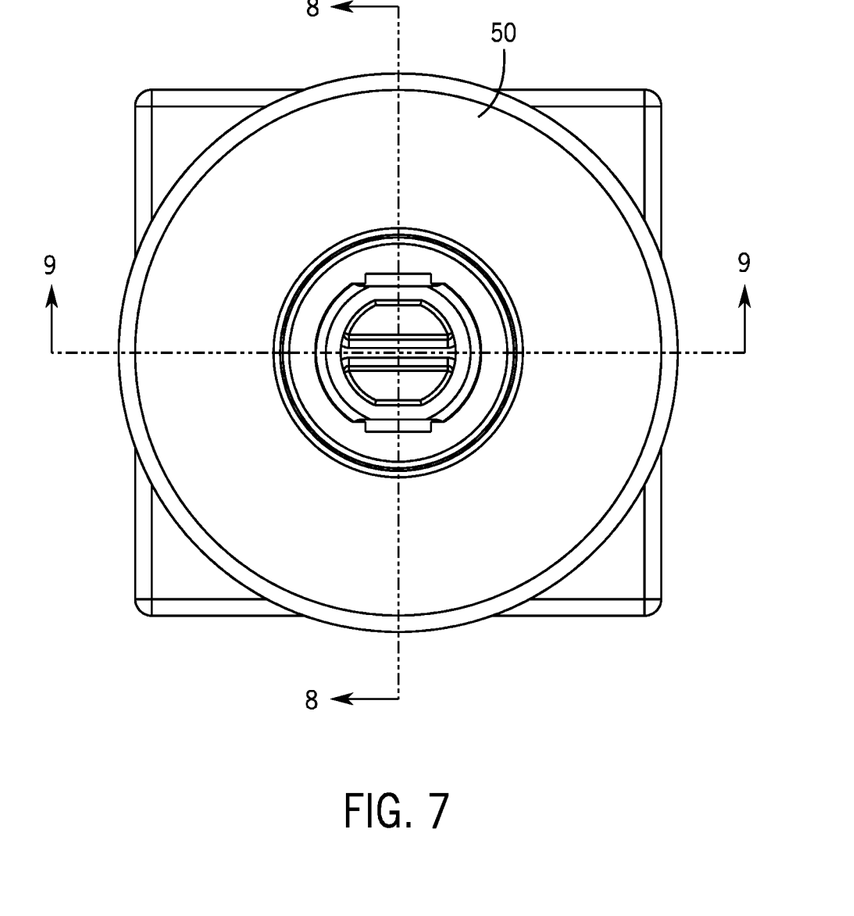
FIG. 7 illustrates a front view of the low-friction roller assembly with the wheel attached.
Figure 8:
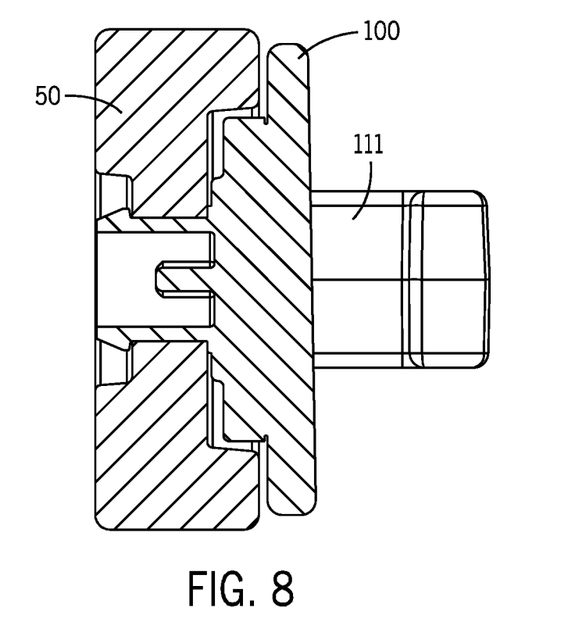
FIG. 8 illustrates a cross-sectional view of the low-friction roller assembly with the wheel attached.
Figure 9:
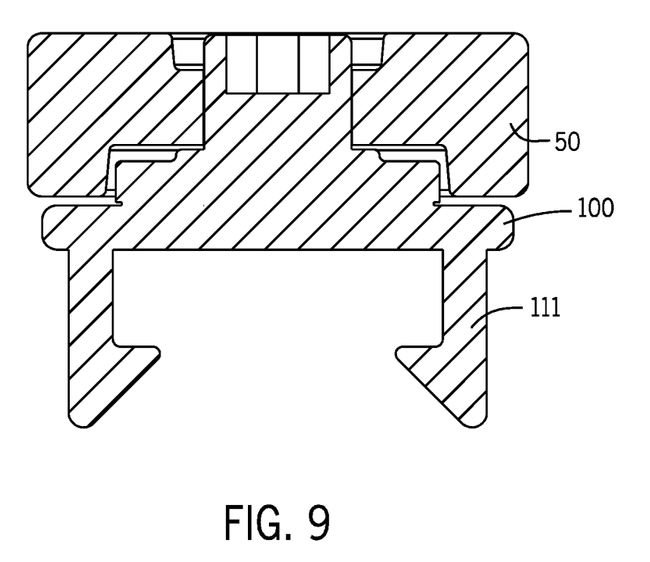
FIG. 9 illustrates a cross-sectional view of the low-friction roller assembly with the wheel attached.
Figure 10:
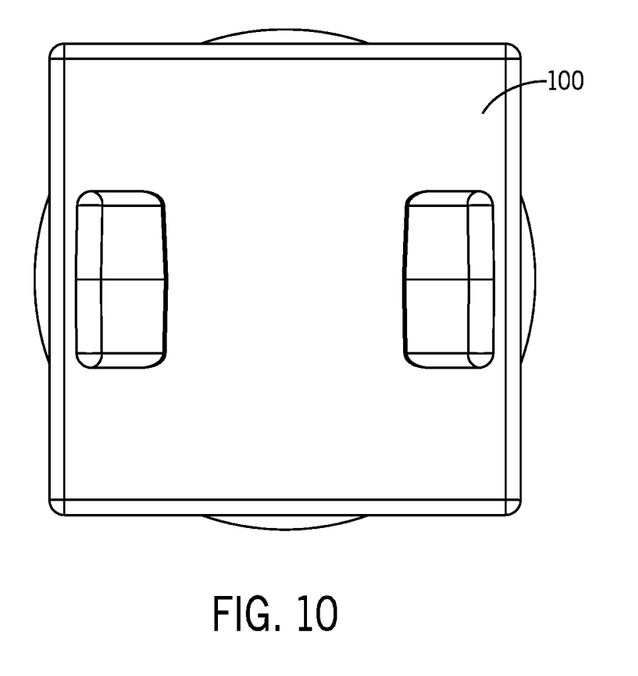
FIG. 10 illustrates a back view of the low-friction roller assembly with the wheel attached.
Figure 11:
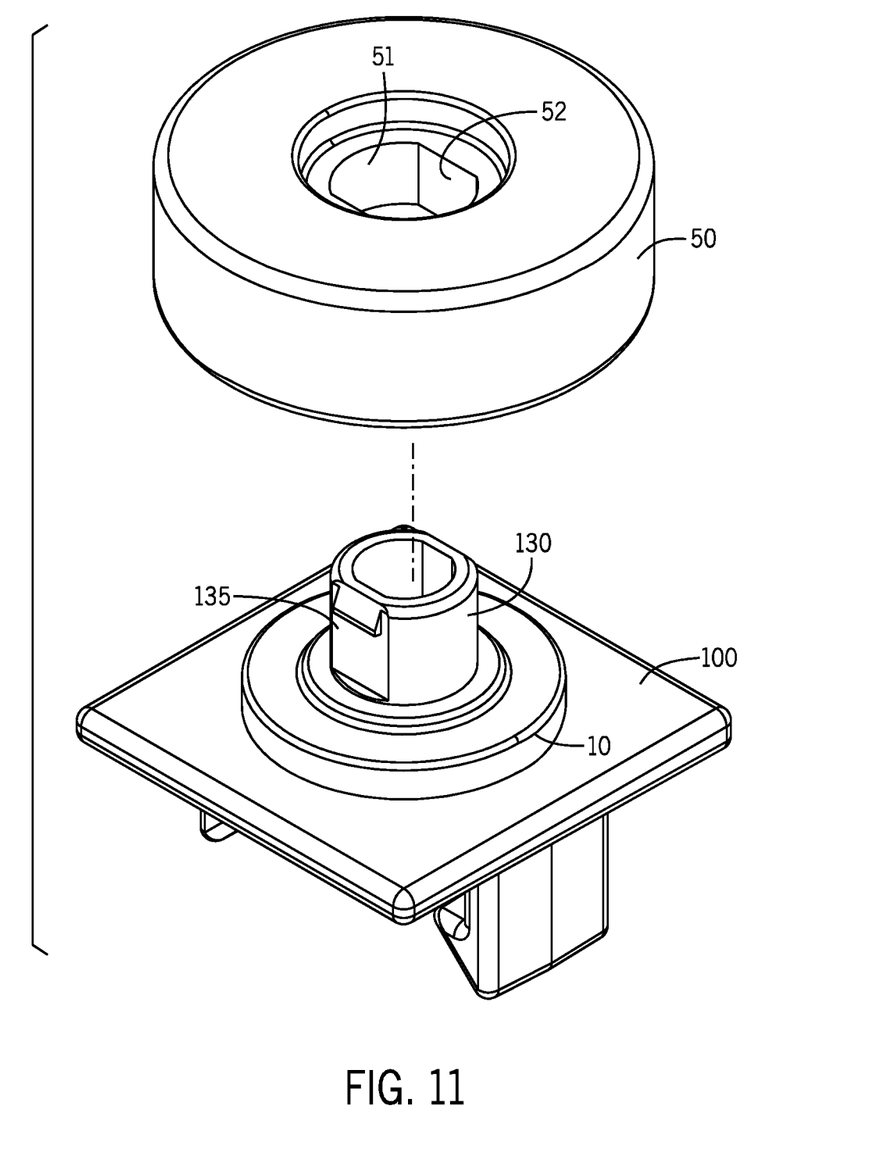
FIG. 11 illustrates a perspective exploded view of the low-friction roller assembly with the wheel.
Figure 12:
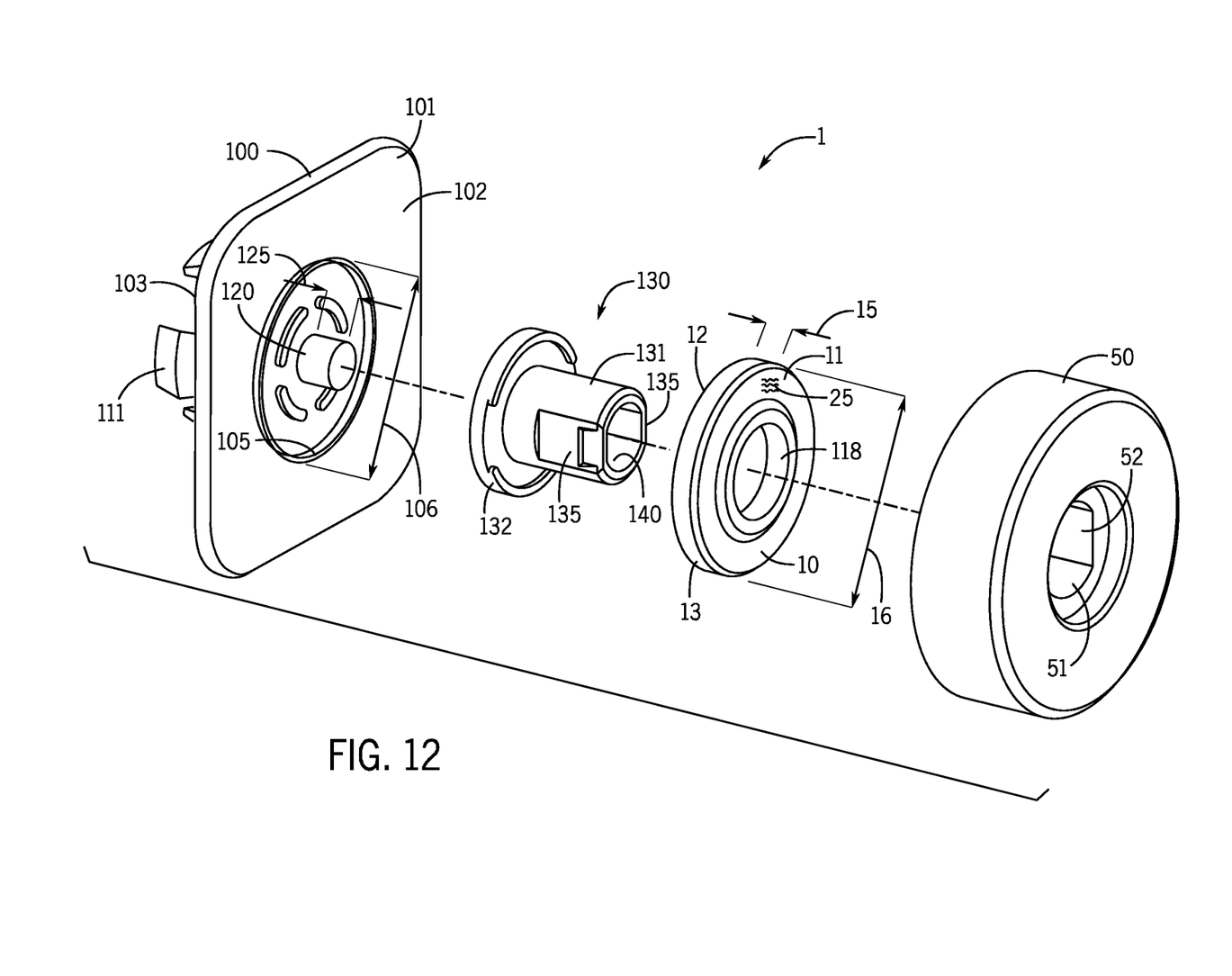
FIG. 12 illustrates a perspective exploded view of the low-friction roller assembly with the wheel.

Referring first to FIG. 12, in an embodiment, a low-friction roller assembly 1 is provided. The low-friction roller assembly 1 may be made of various materials, including, by example, metal and plastic components. The low-friction roller assembly 1 may have a housing unit 10, a wheel 50 and a wall mount 100. In an embodiment, the wheel 50 may rotate three hundred and sixty degrees with respect to the housing unit 10 and/or wall mount 100.

Figure 13:
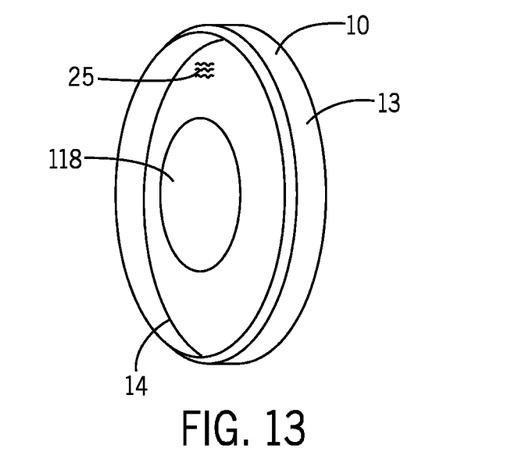
FIG. 13 illustrates a perspective view of the housing unit of the low-friction roller assembly.

The illustrations show the housing unit 10 as circular, although other exterior shapes may be utilized provided that the interior is circular. The housing unit 10 may have a front surface 11, a back rim 12, a side 13 and an interior 14 (FIG. 13). The housing unit 10 may lack a back surface in an embodiment. The side 13 of the housing unit 10 may have a length 15 and the front surface 11 of the housing unit 10 may have a diameter 16. A fluid 25 may be permanently sealed within the interior 14 of the housing unit 10 as discussed below. In an embodiment, the fluid is not air, but a liquid.

Figure 14:
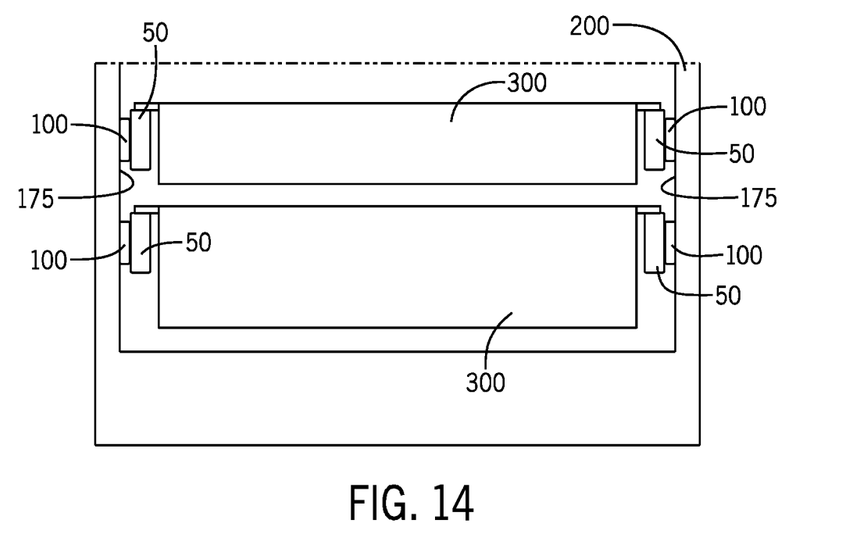
FIG. 14 illustrates a front view of multiple low-friction roller assembly units secured to a drawer of a refrigerator.

In an embodiment, the wall mount 100 may have a back plate 101 having a front 102 and a back 103. The front 102 of the wall mount 100 may face the interior of the appliance 200 (FIG. 14) while the back 103 of the wall mount 100 may be secured to a side wall 175 of the appliance 200. In an embodiment, the appliance 200 is a refrigerator; however, the assembly 1 may be used with various other appliances other than a refrigerator.

Figure 15:
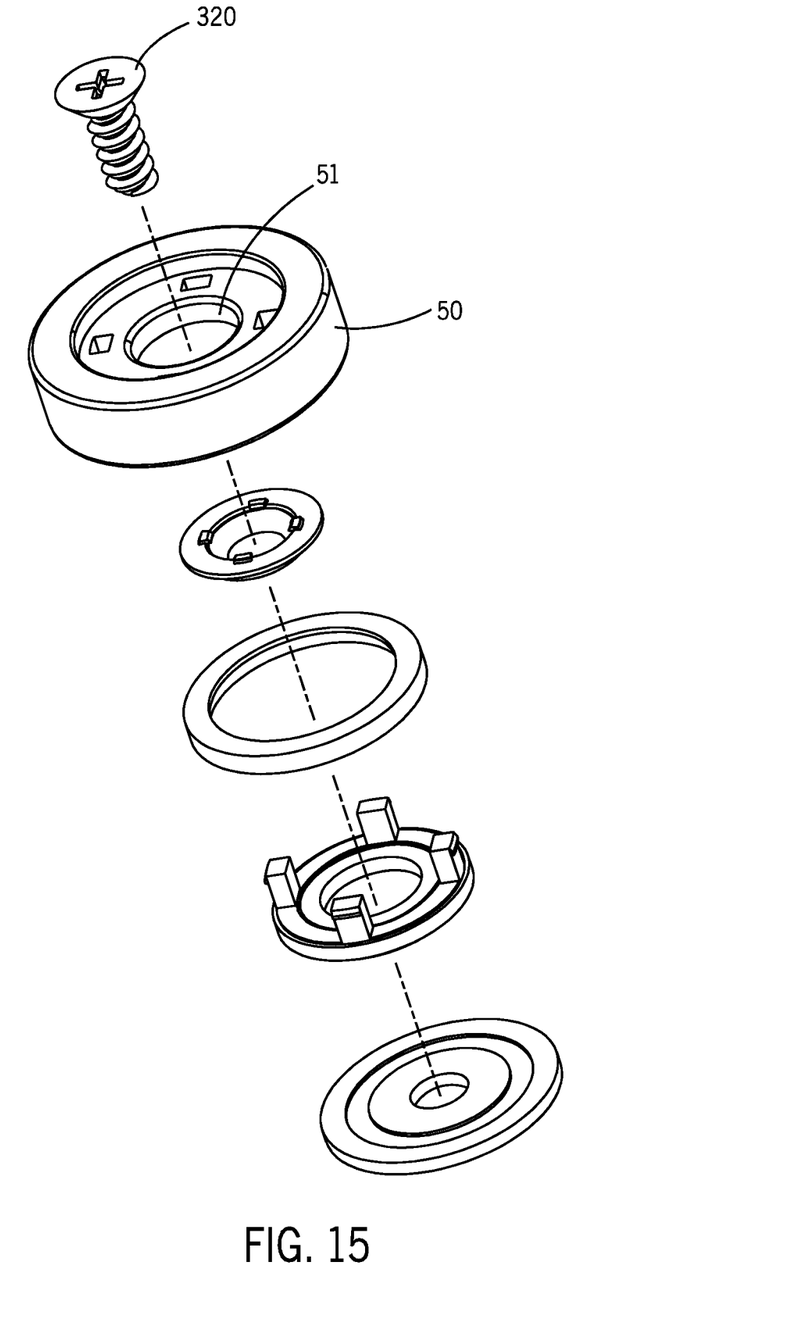
FIG. 15 illustrates an exploded perspective view of the low-friction roller assembly utilizing a screw mount system in one embodiment.

In an embodiment, the wall mount 100 may have a snap component. In particular, the back 103 of the wall mount 100 may have at multiple prongs 111 wherein the prongs 111 may spring snap into an opening (not shown) on the side wall 175 of the appliance 200. As a result, a manufacturer may easily install the assembly 1 systems into openings on the side walls 175 of the appliance 200 to easily install the system. In an alternative embodiment, as shown in FIG. 15, the low-friction roller assembly 1 may utilize a screw 320 mount assembly as opposed to the prong 111 assembly. In particular, a screw 320 may be inserted into the opening 51 of the wheel 50 and may pass through the housing 10 and may be ultimately secured to the side wall 175 of the appliance 200.

The front 102 of the wall mount 100 may have a raised rim 105 having a diameter 106. The diameter 106 of the raised rim 105 may be substantially equal to the diameter 16 of the housing unit 10 so that the housing unit 10 may be secured to the raised rim 105 of the wall mount 100. In particular, in its assembled form, the housing unit 10 is permanently secured to the wall mount 100 at the raised rim 105 so that the raised rim 105 and the back rim 12 of the housing unit 10 form a fluid tight seal preventing the fluid 25 within the housing unit 10 from exiting the housing unit 10.

In an embodiment, a generally cylindrical shaft 120 may extend outward from the front 102 of the wall mount 100. The generally cylindrical shaft 120 may have a length 125. The generally cylindrical shaft 120 may secure an axle 130. The axle 130 may have an extended shaft 131 which is secured to a back plate 132. In an embodiment, the axle 130 may be generally cylindrical, but may have at least one flat surface 135. The figures illustrate two flat surfaces 135 located one hundred and eighty degrees with respect to each other on the generally cylindrical shaft 120.

The axle 130 may have a hollow interior portion 140. Generally cylindrical shaft 120 of the wall mount 100 may be partially located in the interior hollow portion 140 of the axle 130 so that the axle 130 is secured by the generally cylindrical shaft 120 of the wall mount 100. As a result, the back plate 132 of the axle 130 is completely located within the housing unit 10 while a portion of the generally cylindrical shaft 130 extends out of the housing unit 10 through a circular opening 118 of the housing unit 10. The generally cylindrical shaft 131 of the axle 130 may secure the wheel 50 of the assembly 1 (as discussed below). The fluid may be prevented from exiting the housing unit by a seal between the housing unit 10 and the axle 130.

In an embodiment, the wheel 50 has a circular opening 51 which receives the generally cylindrical shaft 131 of the axle 130. The circular opening 51 may also have at least one generally flat surface 52 (FIG. 12), or even a non-circular surface, which aligns with and contacts the generally flat surface(s) 135 of the generally cylindrical shaft 131 of the axle 130. As a result of the flat surfaces 135 of the axle 130 and the flat surfaces 52 of the wheel 50 aligning, the axle 130 and the wheel 50 therein rotate in unison together three hundred and sixty degrees around the shaft 120 of the wall mount 100.

As stated above, located within the housing unit 10 of the assembly 1 may be a fluid 25. The fluid 25 may completely fill the entire interior of the housing unit 10 (other than the other components) such that no air is present within the housing unit 10.

In an embodiment, the wheel 50 is attached to a drawer 300 (FIG. 14) which is attached to the appliance 200. The fluid 25 located within the interior 14 of the housing unit 10 therein allows the back plate 132 and a portion of the axle 130 and, therefore the drawer 300 to be smoothly and quietly be pulled out or pushed in within the appliance 200.

In an embodiment, the fluid 25 is a grease. It should be noted that the fluid 25 may vary depending on the desired application for which the assembly 1 is to be used. In particular, a fluid 25 which is thicker may be used when slower movement of the wheel is desired and a thinner fluid 25 may be used when a faster moving wheel is desired.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

We claim:

1. A wheel assembly for a drawer comprising:
 a housing unit having an opening;
 a wheel;
 a wall unit;

wherein the housing unit has an interior and where a fluid is located within the interior;

an axle having a shaft portion and a back plate portion wherein the back plate portion of the axle is permanently located within the housing unit and wherein the shaft portion extends outside of the housing unit;

wherein the shaft portion of the axle is connected to the wheel; and wherein the housing unit is connected to the wall unit.

2. The wheel assembly for a drawer of claim 1 wherein the opening of the housing unit is circular.

3. The wheel assembly for a drawer of claim 1 further comprising:

a front and a back of the wall unit wherein the back of the wall unit has at least a first securing prong and wherein the first securing prong is capable of being secured to an object.

4. The wheel assembly for a drawer of claim 1 wherein the wheel is capable of rotating three hundred and sixty degrees with respect to the housing unit.

5. The wheel assembly for a drawer of claim 1 further comprising:

at least one flat surface of the shaft portion of the axle wherein the flat surface of the shaft portion of the axle aligns with and contacts a flat surface of an inner wall of the wheel.

6. The wheel assembly for a drawer of claim 1 wherein the fluid within the interior of the housing is a liquid.

7. The wheel assembly for a drawer of claim 6 wherein the liquid is grease.

8. The wheel assembly for a drawer of claim 1 further comprising:

a front and a back of the wall unit wherein the front of the wall unit has a raised lip portion having a diameter; and wherein the housing unit has a diameter which is substantially similar to the diameter of the raised lip portion and wherein the raised lip of the front of the wall unit locks the housing unit to the front of the wall unit.

9. The wheel assembly for a drawer of claim 1 further comprising:

a front and a back of the wall unit; and wherein the back of the wall unit is secured to a wall of an appliance and wherein the wheel of the assembly is secured to a drawer of the appliance.

10. The wheel assembly for a drawer of claim 1 further comprising:

an extended shaft on a front of the wall unit wherein the extended shaft of the front of the wall unit receives the axle and allows the axle to rotate three hundred and sixty degrees with respect to the extended shaft of the wall unit.

11. The wheel assembly for a drawer of claim 1 wherein the housing unit has a front surface and lacks a back surface.

* * * * *